UNITED STATES PATENT OFFICE.

ERNEST A. LE SUEUR, OF OTTAWA, ONTARIO, CANADA.

ART OF PREPARING AMMONIUM PERCHLORATE.

1,284,380.

Specification of Letters Patent.   Patented Nov. 12, 1918.

No Drawing.   Application filed December 29, 1917.   Serial No. 209,415.

*To all whom it may concern:*

Be it known that I, ERNEST A. LE SUEUR, a subject of the King of Great Britain, residing at Ottawa, in the county of Carleton and Province of Ontario, Dominion of Canada, have invented new and useful Improvements in the Art of Preparing Ammonium Perchlorate, of which the following is a specification.

My invention relates to improvements in the manufacture of ammonium perchlorate from the well known reaction of ammonium sulfate with sodium perchlorate. When suitable proportions, for example chemically equivalent proportions, of these latter materials are treated with water (whether at a high temperature at which all the perchlorates involved in the reaction are dissolved or, at a lower one, at which the sodium sulfate produced is completely dissolved but not the ammonium perchlorate) and the resulting solution is progressively cooled, the bulk of the total ammonium perchlorate first separates but on further cooling sodium sulfate begins to crystallize with the residual ammonium perchlorate. Other means must consequently be found for eliminating the sodium sulfate from the partly cooled solution from which the above first separation of ammonium perchlorate has occurred. Hitherto this has been done by concentrating the solution at a high temperature whereby a portion of said sulfate separates in the anhydrous condition. I have discovered that I can secure a large yield of hydrated sodium sulfate substantially unmixed with ammonium perchlorate by taking the said solution, suitably diluting it, for example to the extent of about half its volume, and chilling the mixture, preferably to about zero C.; but, as below, the precise proportion of diluting water depends chiefly on the final temperature of chilling. Separation of sodium sulfate in large quantity, substantially free from crystals of ammonium perchlorate, occurs. The final liquid contains the ammonium perchlorate, a residue of sodium sulfate and much less water than the total amount used on account of the abstraction of water by the hydrated crystals. I prefer to employ the said liquid in the primary operation of treating the raw materials instead of water. Said liquid, or any excess of it, can, of course, be separately concentrated, cooled and treated to separate its saline ingredients. I prefer, however, to use it all to treat the raw materials and evaporate the whole mixture to the desired concentration and, as some evaporation usually goes on during the dissolving of the raw materials, there is little or no need for further concentration. The precise proportions of water to original materials and of diluting water to the partly cooled liquid rich in sulfate depend chiefly on the different working temperatures selected, especially the final temperature of chilling to separate hydrated sodium sulfate.

I claim:

1. The process of preparing ammonium perchlorate which consists in treating ammonium sulfate and sodium perchlorate with water, bringing to a temperature slightly above that at which substantial separation of hydrated sodium sulfate occurs, whereby a copious development of crystalline ammonium perchlorate is secured, separating the liquid from the crystals, diluting the former and chilling, whereby hydrated sodium sulfate crystallizes.

2. The process of preparing ammonium perchlorate which consists in treating ammonium sulfate and sodium perchlorate with water, bringing to a temperature slightly above that at which substantial separation of hydrated sodium sulfate occurs, whereby a copious development of crystalline ammonium perchlorate is secured, separating the liquid from the crystals, diluting the former and chilling, whereby hydrated sodium sulfate crystallizes, and working the liquid residue for ammonium perchlorate.

ERNEST A. LE SUEUR.